O. W. ALLISON.
Paper-Bag Machine.

No. 207,702.      Patented Sept. 3, 1878.

WITNESSES
Ed. J. Nottingham
A. W. Bright.

INVENTOR
Oscar W. Allison.
By Leggett and Leggett,
ATTORNEYS

O. W. ALLISON.
Paper-Bag Machine.

No. 207,702.

Patented Sept. 3, 1878.

WITNESSES
Ed. J. Nottingham
A. W. Bright

INVENTOR
Oscar W. Allison
By Leggett and Leggett
ATTORNEYS

O. W. ALLISON.
Paper-Bag Machine.

No. 207,702. Patented Sept. 3, 1878.

WITNESSES
Ed. J. Nottingham
A. W. Bright

INVENTOR
Oscar W. Allison.
By Leggett & Leggett,
ATTORNEYS

UNITED STATES PATENT OFFICE.

OSCAR W. ALLISON, OF CLEVELAND, OHIO.

IMPROVEMENT IN PAPER-BAG MACHINES.

Specification forming part of Letters Patent No. 207,702, dated September 3, 1878; application filed April 9, 1878.

*To all whom it may concern:*

Be it known that I, OSCAR W. ALLISON, of Cleveland, in the county of Cuyahoga and State of Ohio, have invented certain new and useful Improvements in Machinery for Making Paper Bags; and I do hereby declare the following to be a full, clear, and exact description of the invention, such as will enable others skilled in the art to which it pertains to make and use it, reference being had to the accompanying drawings, which form part of this specification.

My invention relates to an improved paper-bag machine, and particularly to that class of machines that produce the so-called "satchel-bottom" paper bags.

My invention consists in new and improved mechanism for forming the tube, folding and pasting the bottom, and, when completed, delivering the bags from the machine.

In the drawings, Fig. 2, a partial side elevation, and Fig. 3 a partial plan view, of the same. Fig. 4 is a view, in side elevation, of the "former," with the drum in section. Fig. 6 is a detached view, showing the workings of the nippers. Fig. $6^a$ is a view, in cross-section, on line $x\ x$ of Fig. 6; Fig. 7, detached view, showing the nippers and their connections. Fig. $7^a$ is a view, in side elevation, of the nipper $r^1$. Fig. $7^b$ shows the nippers $r^3$ and $r^1$ in edge view. Fig. $7^c$ represents the communication-rod $r^6$ in full side elevation, and also in side elevation, part section. Fig. $7^d$ represents the guide $r^9$ in side view, edge view, and cross-sectional view. Fig. $7^e$ represents the nipper $r^2$ in different views; Fig. 8, detached views of feed-rolls, with rubber or gutta-percha sleeves $E'\ E'$; Fig. 17, Sheet 2, a cam that is attached to the large wheel and serves to open the nippers.

Figure 1:
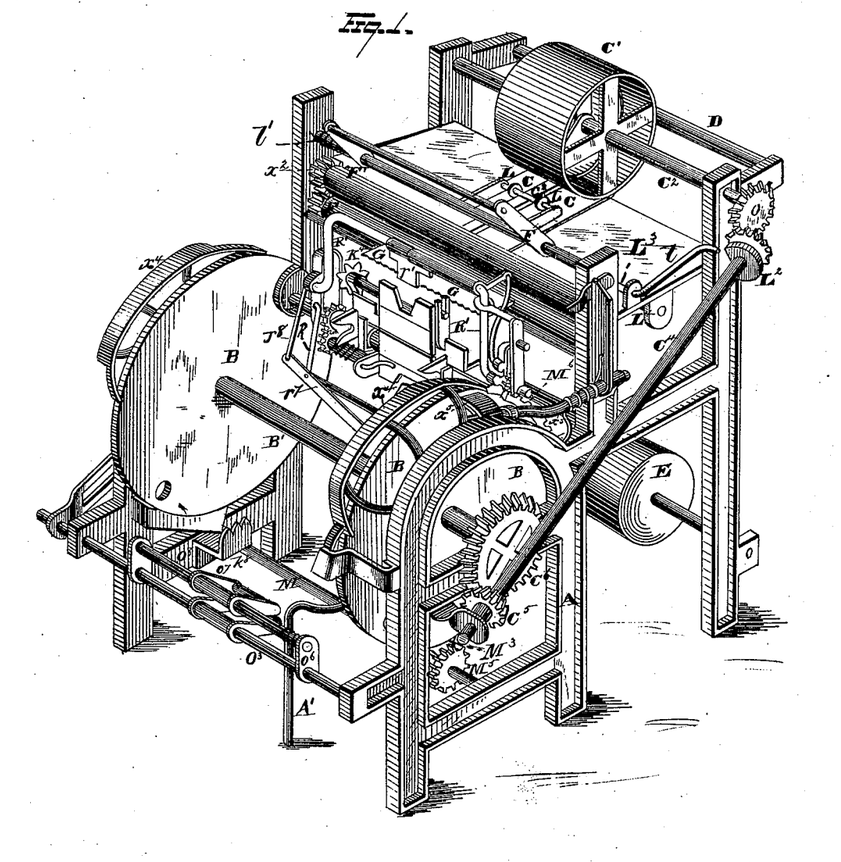
Figure 1 is an isometric view of my invention.
Figures 2, 3, 4, 5, 7:
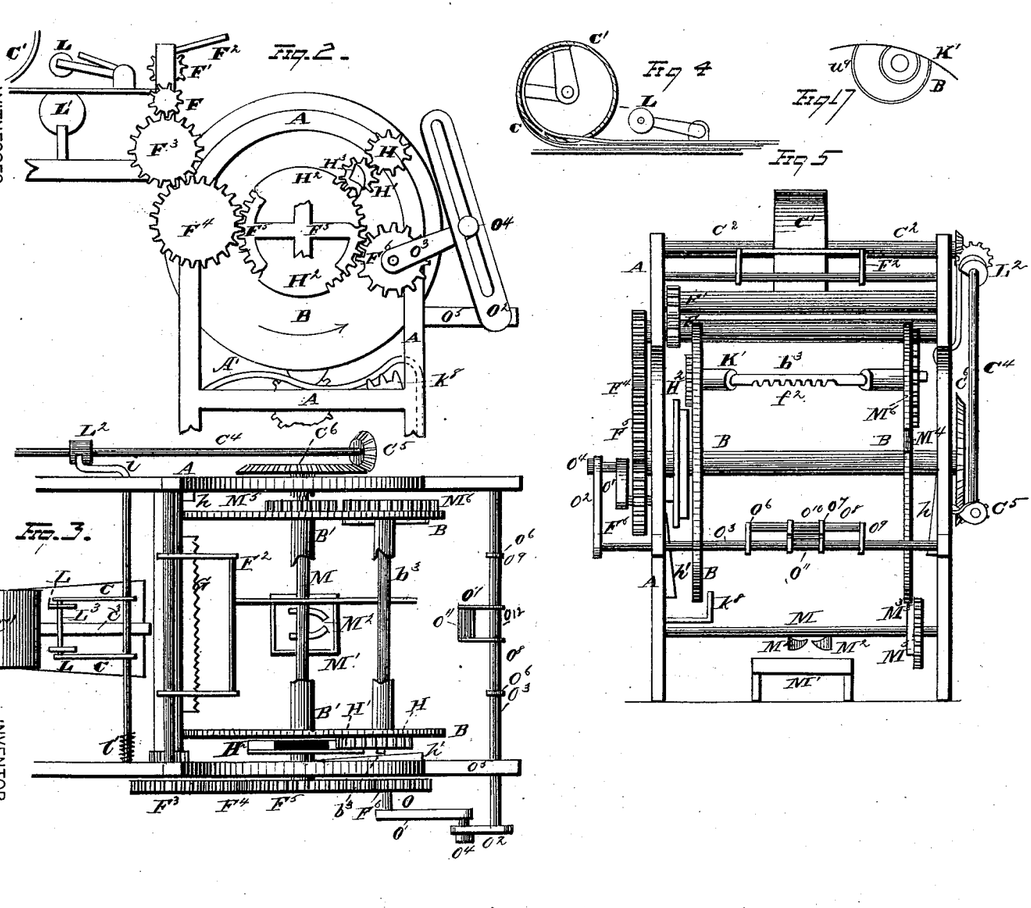
Figures 5, 5A:
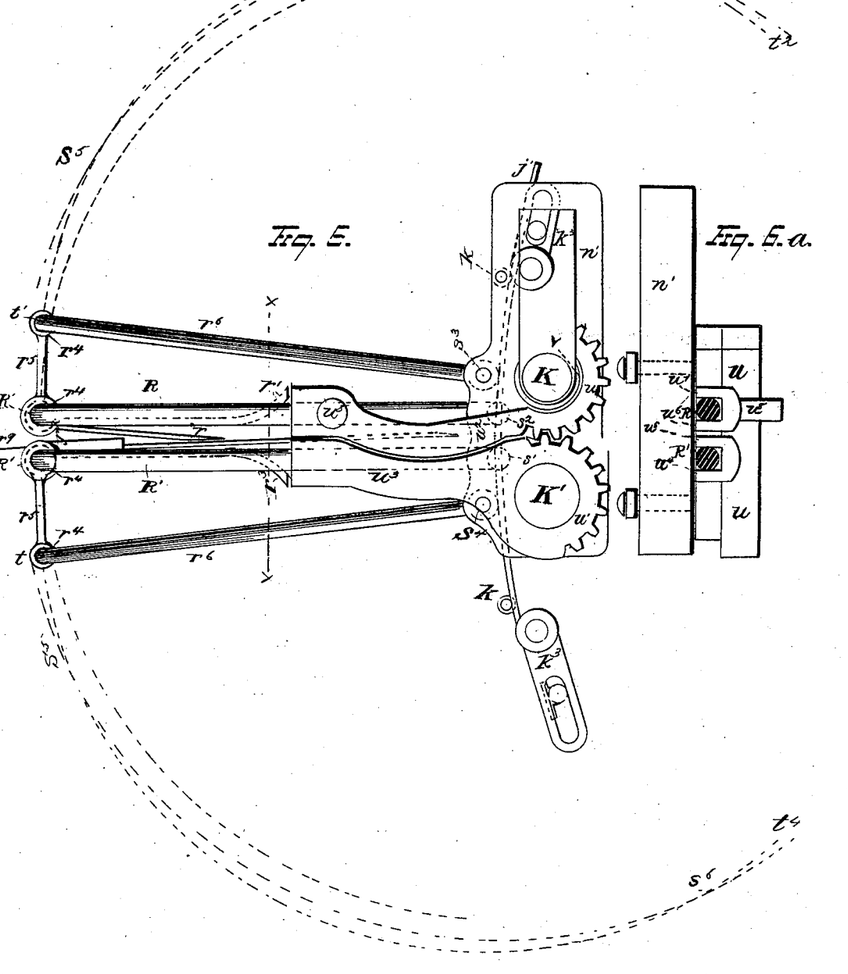
Fig. 5 is a partial elevation of the delivery end of my invention.

A is a frame, suitable in form and material to accommodate the various parts of my device and their operation. B B are large wheels, permanently attached to the shaft $B'$, and between which the heads or cars are suspended that carry the mechanism by which the bottom of the bag is made. C is the former by which the tube is shaped. This former gradually increases in width as it approaches the feed-rolls F and $F^1$. E represents the roll of paper, of the proper width to make any sized bag desired. F and $F^1$ are the main feed-rolls, by which the paper is drawn from the roll E around the former C and fed to the machine. $F^2$ is a spring tension-rod, which takes up the slack of the paper between the feed-rolls F and $F^1$ and the car or head I, Fig. 11. $F^3$, $F^4$, and $F^5$, Figs. 2 and 3, are gear-wheels, connecting the pinion on the main feed-roll F with the main shaft $B'$. G is a serrated cutting-knife, which severs the paper from the roll.

L and $L^1$, Fig. 2, are, collectively, what are called "slitters." L L are blank wheels, against which the lower cutter-wheels, $L^1\ L^1$, are made to revolve, thereby cutting, at the proper time, two slits in the paper tube, which are afterward used in the formation of the bottom. L L are permanently attached to the rock-shaft $L^3$, and $L^1\ L^1$ are permanently attached to permanent shaft $L^4$. Rock-shaft $L^3$ is provided with crank-arm $l$, which is adapted to engage with cam $L^2$, formed on rotating shaft $C^4$. It is provided with suitable spring mechanism, which causes it to rise automatically from the former C immediately upon the release of its crank-arm from engagement with said cam $L^2$.

H and $H^1$ is the gearing by which the head or car is made to revolve by meshing into the segmental gearing $H^2$. $H^2$ is a lock, firmly attached to the large wheel B which carries, the head or car I and the gearing H and $H^1$. $H^1$ and $H^2$ lock the bar $K'$.

Figures 11, 12, 13, 14, 15, 16:
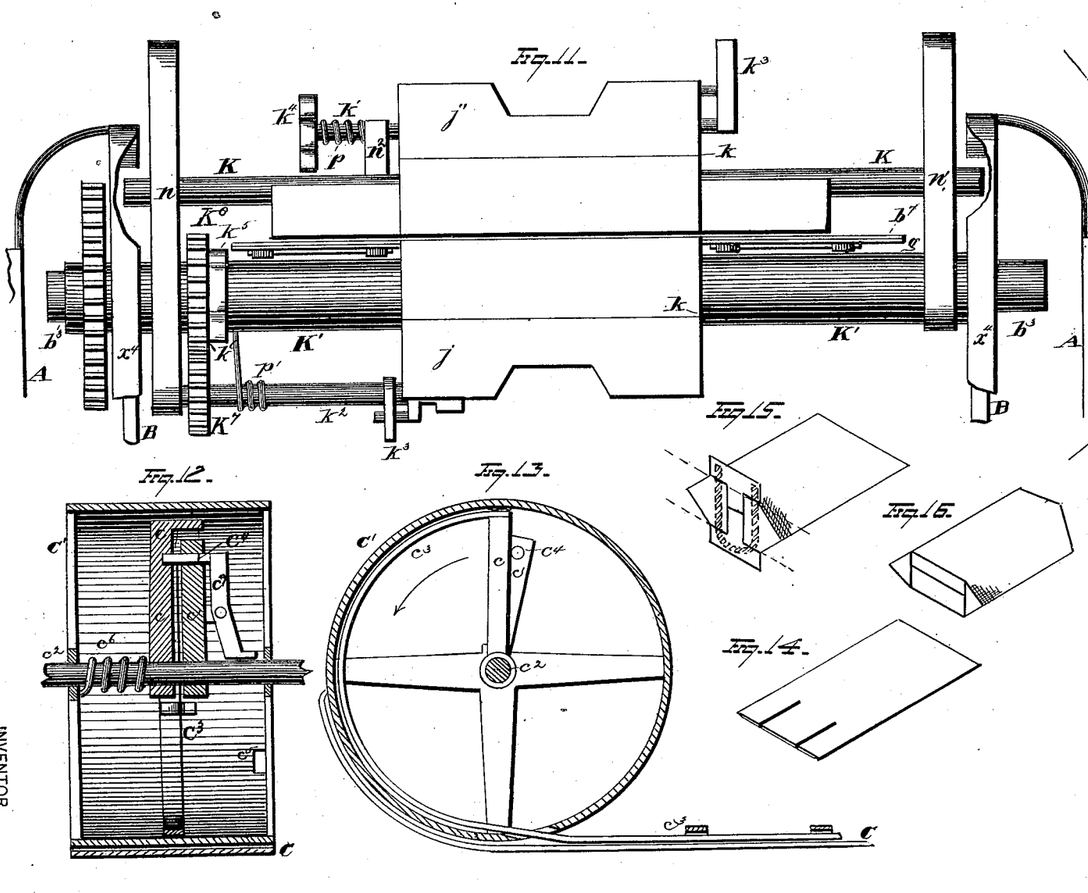
Fig. 11, detached view, showing elevation of device for making the second or last folds of the bottom.
Fig. 13, a detached view of the stationary drum, to which the former is attached.
Fig. 12, sectional view of drum, showing the internal mechanism by which the bar or tongue is operated.
Figs. 14, 15, and 16, views of the bag in different stages in the operation of making the bottom.

I is the head or car, suspended between the large wheels B B, which contains the mechanism for making the bottom folds. K, Fig. 11, is an upper bar, which, with $K'$, the lower bar, holds the paper firmly, and draws it over the serrated knife G. While held by these bars the bottom of the bag is formed, pasted, and folded. The arm $c$, Figs. 12 and 13, is loosely attached to the shaft $C^2$ within the drum $C^1$, and is also connected with the movable bar $c^3$. $C^5$ and $C^6$ are beveled gearing, connecting the shaft $B'$ with shaft $C^2$ by shaft $C^4$. Gearing $C^5$ and $C^6$ is two to one, so that the arm $c$ performs two operations at each revolution of the shaft $B'$ — in other words, it should be so constructed that it will perform the same number of operations at each revolution of the large wheels B B as the large wheels B B have cars or heads I.

In the drawings I have only shown one of these cars or heads, for reason of convenience in exhibiting the construction of the same; but instead of a single one, two or more of them might be employed, the same depending upon the size of the bag to be made, in connection with the diameters of the wheels B and $B'$.

$c^1$ is an arm permanently attached to the shaft $C^2$. On this arm $c^1$ is a pin or stop, $c^4$. When this arm $c^1$ is revolved in the direction indicated, Fig. 13, the pin $c^4$, on pivoted arm $c^7$, strikes the arm $c$, carrying it, with the bar $c^3$, forward until it meets the head I in its revolution. The pin $c^4$, coming in contact with the stop $c^5$, disconnects the arm $c$, when it is carried back, drawing the bar $c^3$ by a coiled spring, $c^6$, Fig. 12, attached to the ordinary drum $C^1$.

M, Fig. 3, is a shaft, to which is permanently attached the paste-wheels $M^2$. $M^1$ is the paste-box, through which the paste-wheels $M^2$ revolve. $M^3$, Fig. 5, is a lock on the shaft M, which holds, by contact with the notch $M^4$ on the wheel B, the paste-wheel $M^2$ in position, so that the gear $M^5$ on the shaft M will mesh into the segmental gear $M^6$ as it is reached in the revolution of the wheel B. The object of this is to carry the paste from the box $M^1$ to the bottom of the bag at the proper time to secure the bottom folds.

$A'$ is a curved wire arch, located about centrally between the two wheels B and $B'$, and is of form, as shown, adapted to cause the nipper-bars R and $R'$ to separate as the same come in contact therewith.

$F^6$, Figs. 2, 3, and 5, is a gear attached to the shaft O. $O^1$ is a crank keyed upon the shaft O. $O^4$ is a pin on the crank $O^1$, which moves in a slot in the arm $O^2$ and is keyed onto the shaft $O^3$. The shaft $O^3$ is supported by the brackets $O^5$. The gear $F^6$ meshes into the gear $F^5$. The arm $O^6$ is permanently attached to the shaft $O^3$. $O^7$ is an arm permanently attached to the shaft $O^8$.

Figure 18:
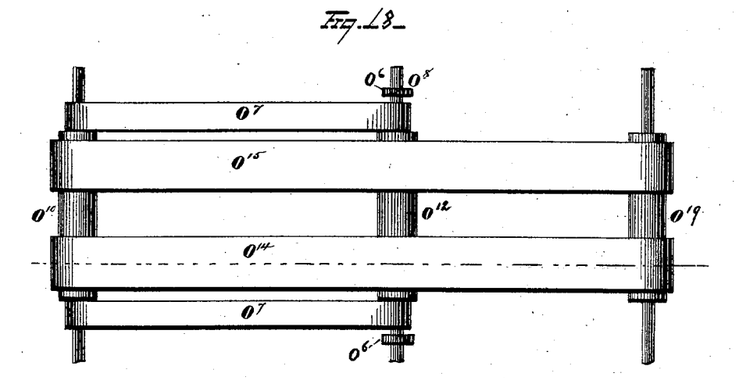
Fig. 18 is a plan view of the system of endless belts. Fig. $18^a$ is a longitudinal sectional view of the same.
Figure 18A:
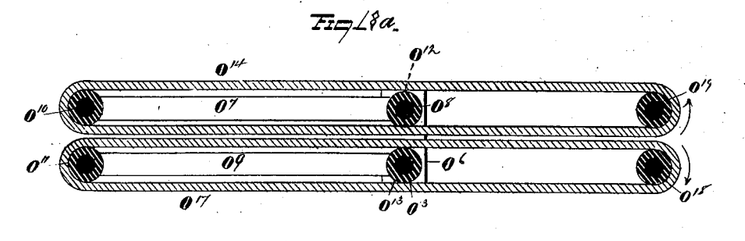

$O^8$, Fig. 18, is a shaft, attached by arms $O^6$, Fig. 5, to the shaft $O^3$. $O^{10}$ and $O^{11}$ are band-wheels, attached to the end of the arms $O^7$ and $O^9$. $O^{12}$ and $O^{13}$ are band-wheels on the shafts $O^3$ and $O^8$. $O^{14}$ and $O^{15}$ are endless belts, passing around the band-wheel $O^{10}$ and under the band-wheel $O^{12}$ to the pulley $O^{19}$. $O^{16}$ (not shown) and $O^{17}$ are two endless belts, that pass around $O^{11}$ and under $O^{13}$. These belts receive motion from the pulley $O^{18}$. $O^{18}$ (not shown) and $O^{19}$ are driving-pulleys, running in opposite directions.

Figure 9:
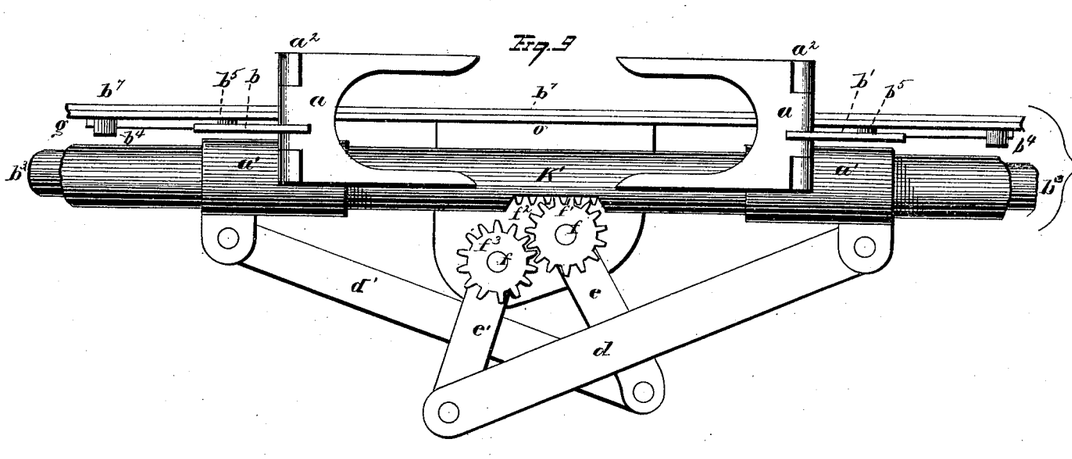
Figs. 9 and 10, detached views, showing elevation and plan of the folders for making the first fold.
Figure 10:
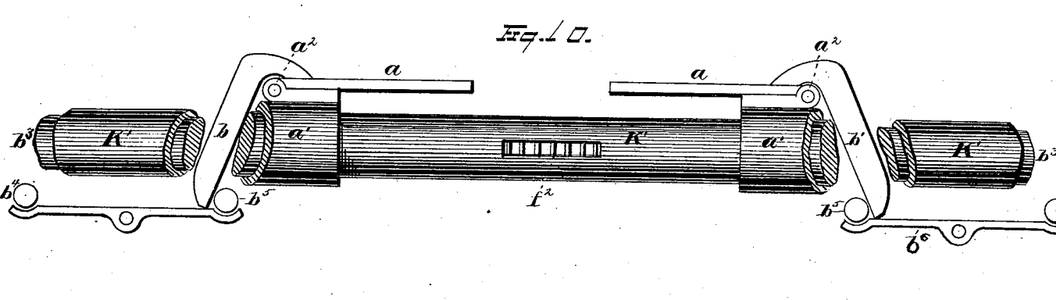

In Fig. 9, $a$ $a$ are folding-fingers, attached to sleeves $a^1$ $a^1$ by a hinge, $a^2$. The sleeves $a^1$ $a^1$ slide upon the bar $K'$. $b^3$ is a sliding bar, operating within the hollow bar $K'$. It has a rack, $f^2$, cut in its center to match the gear-wheel $f^1$. $f^3$ is a gear-wheel, of the same diameter as $f^1$, and meshes into $f^1$. Gear-wheels $f^1$ and $f^3$ are permanently attached to and receive their motion from the shafts $f$ $f$. $e$ and $e'$ are cranks mounted on the shafts $f$ $f$. $d$ and $d'$ are connecting-rods, connecting the cranks $e$ and $e'$ with the sliding sleeves $a^1$ $a^1$. $g$ is a center-piece, made secure to the center of the bar $K'$. It serves to hold the gear $f^1$ and $f^3$ in the rack $f^2$ as the bar $b^3$ is moved. The bar $b^3$ is made to slide within the bar $K'$ by its contact with cam $h$, attached to the frame A, which operates to close the fingers $a$ $a$ as the large wheel B is made to revolve. The bar $b^3$ comes in contact with the cam $h'$, which forces back the bar $b^3$ and opens the fingers $a$ $a$.

$b$ and $b^1$ are levers attached to the fingers $a$ $a$, and, by coming in contact with stops $b^4$ and $b^5$ on the casting or center-piece $g$, operate to open and close the fingers as the bar $b^3$ is made to slide within the bar $K'$. The fingers traveling the distance between the stops $b^4$ and $b^5$ allows them to lie close to the head I, by which means they are drawn away from the bag after the two last folds are made.

$b^6$ is a spring, that holds the fingers in position whether open or shut. $b^7$ is an apron, made secure to the casting $g$. It serves the double purpose of strengthening the head and acting as a guide to the paper.

In Fig. 11, $j$ and $j'$ are folders, hinged at $k$ and mounted on the face of the head or car. They make the two last folds.

$k^1$ and $k^2$ are shafts, connected with the folders $j$ and $j'$ by the cranks $k^3$. The coarse gear $k^4$ on the end of the shaft $K'$ meshes into the stationary rack $k^8$, Fig. 5, thereby turning the folder $j'$.

$k^5$ is coarse gear, secured to coarse gear $k^6$, both mounted loosely on bar $K'$. Gear $k^6$ meshes into gear $k^7$. $k^7$ is permanently attached to shaft $k^2$. $k^5$ is engaged with rack mechanism which turns the folder $j$.

$p$ and $p'$ are springs, attached to the shafts $k^2$ and $k^1$. The office of these springs is to force back the folders after the fold is complete.

In Fig. 11, the links $n$ and $n^1$ are secured firmly to the bar $K'$, and act as guides to the bar K when the same is raised or lowered. The bar $k^2$ is held in position by bearings on the center-piece $g$ and link $n$. The shaft $k^1$ is held in position by the bearings $n^2$, secured to the bar $k$.

In Fig. 6, R is the bar supporting the upper nippers, $r$ and $r^1$, $R'$ performing the same office for the lower nippers, $r^2$ and $r^3$. The sleeve $r^4$, Fig. 7, is loosely attached to the upper nipper-bar, R, Fig. 6, with the nipper $r$ secured to it at one end. At the other end of the sleeve $r^4$ is a crank, $r^5$.

The connection-rod $r^6$ connects one end of the crank $r^4$ with the link $n^1$.

The connection-rod $r^6$, as shown in Fig. 7, has a coil-spring about it, to allow it to shorten or lengthen, as circumstances require.

$r^9$ is a guide, moving through the nipper $r^2$ and worked by the lever $r^7$, which is connected with the link $n$ by the bar $r^8$, so that when the nipper $r^1$ is placed in position the office of $r^9$ is to guide the nippers $r$ and $r^2$ inside of the paper tube. As the large wheels B B revolve the guides are drawn back out of the way by the bar $r^8$ and lever $r^7$. The bar $r^8$ is connected with the link $n$ at the point $s^3$.

In Fig. 6, $u$ is a gear attached loosely to the bar K. $u^1$ is a gear attached to a sleeve, $v$. Sleeve $v$ is attached to the link $n^1$. The arms $u^3$ and segmental gear $u$ are firmly united, or may be cast in one piece. The arm $u^2$ and gear $u^1$ are united in the same manner. The arm $u^3$ has two lugs upon it—$u^4$ and $u^5$, Fig. 6$^a$. These lugs straddle the nipper-bar R'. $u^2$ has two lugs upon it—$u^6$ and $u^7$—which straddle the nipper-bar R.

$u^8$ is a hub on the arm $u^2$. As the head or car revolves, the hub $u^8$ comes in contact with the cam $u^9$, Fig. 17, which cam is eccentric with the center of the bar K', and causes the nippers to open and the points $t$ and $t^1$ to move to the points $t^1$ and $t^2$.

The nipper-bar R', moving upon its axle $s^1$, and the connection-rod $r^6$ connecting the crank $r^5$ with the sleeve $r^4$, Fig. 7, and the nipper $r^2$, as the nipper-bar R' moves about its center $s^1$, and the connecting-rod $r^6$ moving on its center $s^4$, $s^1$ and $s^4$, having an eccentric relation to each other, substantially as shown in Fig. 6, cause the nipper $r^2$ to close at $s^5$ and grasp the paper tightly until it passes to the point $s^6$, when it loosens its hold and allows the folder $j$ to draw it from the nipper and fold it over the fingers $a\ a$.

Figures 7, 7A, 7B, 7C, 7D, 7E, 8:
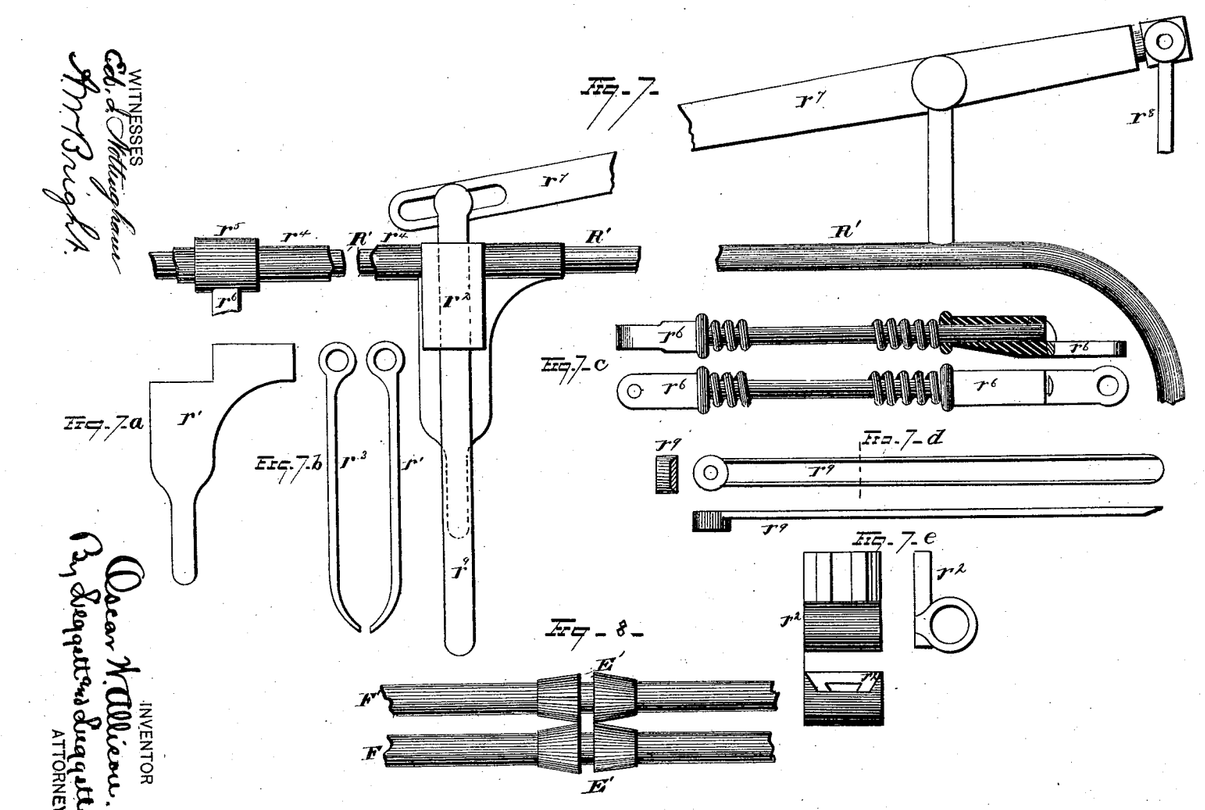

Having thus described the construction of the machine, its operation of making a paper bag and delivering it from the machine is as follows: The roll of paper, of proper width to make the sized bag desired and of indefinite length, having been placed upon the roller, as shown at E, Fig. 1, and suspended so as to be unwound and supplied to the machine as fast as required, the end of the paper is drawn over the roller D. At or near the roller D the paste is applied, in any suitable manner, to one of the outer edges of the paper, for the purpose afterward of uniting the two edges of the paper and making the tube from which the bags are cut. From thence the paper is passed under the former C. The paper is broken or creased on the former at the point of contact of the former C with the drum $C^1$. The paper is then passed along under the former C, at the same time folding over it, forming a tube. It next passes to the slitters L and $L^1$. These slitters, by the action of the cam $L^2$ upon a lever at the end of the shaft to which the slitters L are attached, cut the paper tube longitudinally for a short distance, as shown in Fig. 14, the distance having been previously determined and the slitters properly adjusted. At the proper time the slitters L are raised from the paper by the cam $L^2$, and the tube permitted to pass freely to the rolls F and $F^1$, where the side seam is set. The rolls F and $F^1$ also act as the main feed-rolls of the machine, to draw the paper from its original roll E and feed it to the heads or cars as they reach in their revolution the point opposite the rolls F and $F^1$. On the upper roll, $F^1$, are two rubber or gutta-percha sleeves, or their equivalent, permanently attached, as shown in Fig. 8. The office of these sleeves is to draw the paper around the former C. These sleeves, as shown, are made conical or conoidal in shape, with their bases toward the center of the roll, and only separated sufficiently to admit the passage of the bar $C^3$. The rubber or gutta-percha cones, above described, at their apex ends are of the same diameter as the pitch-line of the gear $x^2$, where the two rolls F and $F^1$ are geared together. The object of these sleeves is to draw the paper toward the center of the former. The rubber sleeves, being larger at the center or at their base than the rolls themselves, constantly draw the paper firmly about the former and toward the center. This keeps the paper smooth at its outer edges, which cannot be done successfully unless some device of this kind is provided to draw the paper forward securely at the center of the tube. I prefer for this purpose the rubber sleeve described to any other known device.

The tube, now having been formed and pasted, passes over the serrated knife G and the spring tension-rod $F^2$, which now lies beneath the knife, into the head or car I. At this time the crank $c^1$, mounted on the shaft $C^2$, is turned in the direction indicated by the arrow, Fig. 13, and, bringing the pin $c^4$ in contact with the arm $c$, forces the same forward, carrying with it the bar $c^3$, to which it is attached. The bar $c^3$ being within the paper tube is forced forward, as described, until it meets the guide $r^9$, Figs. 6 and 7, to which it guides the paper tube. The bar is then drawn back by its arm to its first position. The guide $r^9$, inside of the tube, carries it to the fingers $r$ and $r^2$. Both fingers are now inside of the tube, and the finger $r^1$ is above and outside of the tube, and finger $r^3$ below and outside of the tube. A sufficient length of tube to form the bottom of the bag now having passed into the car or head, the bar K runs off the cam $x^4$, Fig. 1, and closes down upon the tube. At the same time the bar $b^3$ comes in contact with the lever $x^5$, which trips the spring tension-rod $F^2$, which takes up the slack of the paper between the car and the rolls F and $F^1$. The rod $F^2$ automatically makes the described movement by reason of a suitable spring tension device, $l'$, with which it is provided, and which serves to throw said rod up, as soon as it is permitted to do so, by means of the engagement of bar $b^3$ with said lever $x^5$. The head or car traveling between the wheels B B in the direction indicated meshes the gear $H^1$ into the segmental gear $H^2$, and causes the head or car to perform three-fourths of a revolution, throwing the face of the head on the arc of a circle. While performing this three-quarter revolution the end of the bar K turns into the cam $u^9$, Fig. 17, Sheet 2, and holds the paper securely until the bottom is made and pasted, and the bag, now traveling toward the endless belts, severed from the tube following. At the same time the pin $v^8$ on the arm $v^2$ comes in contact with the cam $u^9$, which is attached to the wheel B, and causes the nipper-bars R and R' to open and the points $t$ and $t^1$ to move to the points $t^4$ and $t^2$, as shown in Fig. 6. While the points are being passed, as described, the nippers $r^2$ and $r^3$ close onto the paper at the point $s^5$ on the lower part of the tube, and the nippers $r$ and $r^1$ close onto the upper part of the tube at the corresponding point, and draw the first fold of the bottom open, while the fingers $a\ a$ are brought down onto the paper. When the point $t$ passes the point $s^6$ it loosens its hold of the paper and allows the flaps $j$ and $j'$ to draw the paper out of the fingers $r$, $r^1$, $r^2$, and $r^3$.

The fingers $a\ a$ are brought down onto the paper by means of the bar $b^3$, within the bar $k^1$, coming in contact with the cam $h$, attached to the frame A. While the head or car is traveling as described the paper is drawn over the serrated knife G, and at the same time the spring tension-rod $F^2$ is brought down under the knife G, and remains there until tripped again by the next lock.

The operation of the tension-rod striking the paper in its passage to a point under the knife G severs the bag from the tube following, and the tube is fed, as before described, to the next head or car. The car revolving, as indicated, brings the segmental gear $M^6$ in contact with the gear-wheel $M^5$, and turns the paste-rolls at the proper time to apply the paste to secure the folds of the bottom of the bag. After passing the paste-roll the lock $M^3$, by contact with the flange on the wheel B, holds the paste-roll in position until the head or car following reaches it. As the head or car is passing, the coarse gear $k^4$ on the shaft $k^1$ meshes into the segmental gear $k^3$, which is attached to the frame A. This forces the flap $j'$ against the finger $a$, with the paper between them. This turns one side of the bottom fold. The coarse gear $k^5$ is attached to the gear-wheel $k^6$ loosely on the shaft $k^1$. The gear-wheel $k^6$ meshes into the gear-wheel $k^7$ on the shaft $k^2$. $k^5$ engages with rack mechanism and turns the flap $j$ against the finger $a$. This makes the last fold of the bottom. The flaps $j$ and $j'$ are drawn back by springs on their shafts $k^1$ and $k^2$. The bar $b^3$ comes in contact with the cam $h'$, and, being forced back, draws the fingers from the bag and opens them.

When the gear-wheel $H^1$, Fig. 2, engages with the segmental gear $H^2$ it turns the head one-fourth the way around in the same direction it already has been turned three-fourths the way, thereby completing its revolution. This last operation also turns the bar K out of the cam $u^9$, and loosens the bag from the head or car, and delivers it between the endless belts $O^{14}$ and $O^{15}$ and belts $O^{16}$ and $O^{17}$, Fig. 18, which draw the bag from the head, and the head or car returns to the rolls F and $F^1$, prepared to receive the tube and continue the operation as long as supplied with paper.

Although I show but one head or car in the drawings for the sake of better illustration of the invention, yet in use I prefer to employ two of said heads or cars; however, as before indicated, any number, greater or less than two, may be used.

Having thus described my invention, what I claim as new, and desire to secure by Letters Patent, is—

1. The combination, with the slitted former C and the cutter-wheels $L^1$, located below the same, of the blank-wheels L, located above the former C, and adapted, substantially as shown, to be intermittently brought in contact with said cutter-wheels, substantially as set forth.

2. The combination, with rock-shaft $L^3$, provided with a spring tension device and crank-arm, together with cam $L^2$, formed in rotating shaft $C^4$, of the blank wheels L, indirectly supported on said rock-shaft, slitted former C, and cutter-wheels $L^1$, located below the latter, substantially as set forth.

3. The combination, with the former C, of the stationary drum $C^1$ and the bar $c^3$, which latter is adapted, substantially as shown, to have longitudinal reciprocating movement in and out of said drum, substantially as set forth.

4. The combination, with the former C and the stationary drum $C^1$, having an opening therein, of the flexible spring-bar $c^3$, which passes through said drum-opening, substantially as set forth.

5. The combination, with the former C, having loop-guides on its upper surface, and the stationary drum $C^1$, having an opening therein, of the flexible spring-bar $c^3$, which passes through said drum-opening, and is adapted, substantially as shown, to have movement in the said loop-guides of the former, substantially as set forth.

6. The combination, with rotating shaft $C^1$, having arm $c^1$, rigidly secured thereto, and provided with pivoted arm $c^7$, having pin $c^4$, of the arm $c$, loosely secured on the shaft, flexible spring-bar $c^3$, stop $c^5$, and spring $c^6$, substantially as set forth.

7. The combination, with guide $r^9$, having movement through nipper $r^2$, of lever $r^7$, connecting-bar $r^8$, and link $n$, substantially as set forth.

8. The combination, with nippers $r^3$ and $r^2$, of guide $r^9$, adapted, substantially as shown, to guide the tube to the nippers, substantially as and for the purpose described.

9. The combination, with bar R, provided with the upper nippers, $r$ and $r^1$, of bar R', provided with the lower nippers, $r^2$ and $r^3$, substantially as set forth.

10. The combination, with bar $b^3$, formed with a rack on its central body, tubular bar K', and cam $h$, formed on frame A, of gear-wheel $f^1$ and connecting mechanism, substantially as shown, adapted to close the fingers $a\ a$, substantially as and for the purpose described.

11. The combination, with sliding rack-bar $b^3$, tubular bar K', and cam $h'$, formed on frame A, of gear-wheel $f^1$ and connecting mechanism, substantially as shown, adapted to open the fingers $a\ a$, substantially as and for the purpose described.

12. The combination, with sliding bar $b^3$, gear-wheels $f^1\ f^3$, shafts $f\ f$, and cranks $e\ e'$, of connecting-rods $d\ d'$ and sliding sleeves $a^1\ a^1$, which latter have movement upon bar K', and are, respectively, provided with folding-fingers $a\ a$, substantially as set forth.

13. The combination, with sleeves $a^1\ a^1$, having sliding movement on bar K', and provided with folding-fingers $a\ a$, respectively connected therewith by hinges $a^2\ a^2$, of connecting-rods $d\ d'$, cranks $e\ e'$, shafts $f\ f$, and mechanism, substantially as shown, connecting with said shafts for alternately operating the same in different lines of rotation, substantially as set forth.

14. The combination, with sleeves $a^1\ a^1$, having sliding movement on tubular bar K', and provided with folding-fingers $a\ a$, of bar $b^3$, which slides within said tubular bar, and is adapted, in connection with the engaging mechanism, substantially as shown, to alternately close and open said fingers, substantially as set forth.

15. The combination, with folding-fingers $a\ a$, sliding sleeves $a^1\ a^1$, connecting-rods $d\ d$, cranks $e\ e'$, and rotating shafts $f\ f$, of gear-wheels $f^1\ f^3$, bar $b^3$, provided with rack $f^2$, and suitable cams formed on the frame of the machine, adapted to alternately operate said bar $b^3$ in a reciprocating sliding movement within the tubular bar K', substantially as set forth.

16. The combination, with fingers $a\ a$, adapted to have reciprocating movement, as described, and respectively provided with levers $b\ b^1$, of the casting or center-piece $g$, provided with stops $b^4\ b^5$, substantially as set forth.

17. The combination, with bar R, provided with nippers $r\ r^1$, and bar R', provided with nippers $r^2\ r^3$, the same being carried on the revolving head or car I, of the curved wire arch A', formed as shown, and adapted to separate said bars by engagement therewith, substantially as set forth.

18. The combination, with fingers $a\ a$, adapted to have reciprocating movement, as described, and respectively provided with levers $b\ b^1$, of the casting or center-piece $g$, having stops $b^4\ b^5$, and formed with the apron $b^7$, substantially as set forth.

19. The combination, with the casting or center-piece $g$, of the apron $b^7$, formed or securely attached thereto, said apron being adapted, substantially as shown, to serve the double purpose of strengthening the head and guiding the paper, substantially as set forth.

20. The combination, with bar $b^3$, rack $f^2$, gears $f^1\ f^3$, shafts $f\ f$, cranks $e\ e'$, and connecting-rods $d\ d'$, of sleeves $a^1\ a^1$, fingers $a\ a$, respectively provided with levers $b\ b^1$, and casting or center-piece $g$, provided with stops $b^4\ b^4$ and $b^5\ b^5$, substantially as set forth.

21. The combination, with shaft M, carrying paste-wheels $M^2$, which are adapted to pass through paste-box $M^1$, and provided with lock $M^3$, and gear $M^5$, of wheel B, provided with notch $M^4$ and gear $M^6$, substantially as and for the purpose described.

22. The combination, with folder $j$, hinged at $k$, and connected by crank $k^3$ with shaft $k^1$, of coarse gear $k^4$, secured on end of said shaft, and stationary rack $k^8$, substantially as set forth.

23. The combination, with folder $j$, hinged at $k$, and connected by crank $k^3$ with shaft $k^2$, of gear $k^7$, secured on said shaft, and coarse gears $k^5\ k^6$, both the latter mounted loosely on bar K', substantially as set forth.

24. The combination, with bar K, adapted, substantially as shown, to be moved in a parallel position to and from bar K', of the serrated cutting-knife G and spring tension-rod $F^2$, adapted to be tripped, substantially as set forth.

25. The combination, with feed-rolls F $F^1$, spring tension-rod $F^2$, adapted, substantially as shown, to be tripped, and the serrated cutting-knife G, of the bars K and K', said bar K being adapted to be moved in parallel position to and from bar K', substantially as set forth.

26. The combination, with gear $u$, attached to sleeve $v$, which latter is attached to link $n^1$, of arm $u^2$, rigidly connected with the gear, said arm formed with two lugs, $u^6\ u^7$, which embrace the nipper-bar R and hub $u^8$, which latter is adapted to engage with cam $u^9$, substantially as set forth.

27. The combination, with feed-rolls F $F^1$ and cutting-knife G, of spring tension-rod $F^2$, lever $x^5$, and bar $b^3$, substantially as set forth.

In testimony whereof I have signed my name to this specification in the presence of two subscribing witnesses.

OSCAR W. ALLISON.

Witnesses:
 JNO. CROWELL, Jr.,
 F. TOUMEY.